(12) United States Patent
Yamazaki et al.

(10) Patent No.: US 8,040,780 B2
(45) Date of Patent: Oct. 18, 2011

(54) OPTICAL PICKUP DEVICE AND OPTICAL DISC APPARATUS

(75) Inventors: Kazuyoshi Yamazaki, Yamato (JP); Yasuo Kitada, Odawara (JP)

(73) Assignee: Hitachi Media Electronics Co., Ltd., Iwate (JP)

(*) Notice: Subject to any disclaimer, the term of this patent is extended or adjusted under 35 U.S.C. 154(b) by 226 days.

(21) Appl. No.: 12/417,053

(22) Filed: Apr. 2, 2009

(65) Prior Publication Data

US 2010/0061202 A1  Mar. 11, 2010

(30) Foreign Application Priority Data

Sep. 5, 2008  (JP) .................................. 2008-227741

(51) Int. Cl.
  *G11B 7/135* (2006.01)
(52) U.S. Cl. .................................................. 369/112.07
(58) Field of Classification Search .................. None
  See application file for complete search history.

(56) References Cited

U.S. PATENT DOCUMENTS

| | | | | |
|---|---|---|---|---|
| 5,923,632 | A * | 7/1999 | Kato et al. | 369/112.07 |
| 6,339,562 | B1 * | 1/2002 | Sakai | 369/44.23 |
| 2005/0286360 | A1 * | 12/2005 | Nakao | 369/44.41 |
| 2006/0013107 | A1 * | 1/2006 | Nishiwaki et al. | 369/112.01 |
| 2008/0019254 | A1 * | 1/2008 | Mori et al. | 369/112.05 |
| 2008/0062826 | A1 * | 3/2008 | Miyazaki et al. | 369/44.23 |
| 2008/0084797 | A1 * | 4/2008 | Sano et al. | 369/44.23 |
| 2009/0201787 | A1 * | 8/2009 | Ogasawara et al. | 369/112.23 |
| 2010/0061202 | A1 * | 3/2010 | Yamazaki et al. | 369/44.23 |

FOREIGN PATENT DOCUMENTS

| | | |
|---|---|---|
| JP | 2004-281026 | 10/2004 |
| JP | 2006-344344 | 12/2006 |
| JP | 2006-344380 | 12/2006 |

OTHER PUBLICATIONS

Sano et al., "Novel One-Beam Tracking Detection Method for Dual-layer Blu-Ray Discs", CPM2005-149 issued by The Institute of Electronics, Information and Communication Engineers, (Oct. 2005, p. 33, figures 4 and 5).

* cited by examiner

*Primary Examiner* — Peter Vincent Agustin
(74) *Attorney, Agent, or Firm* — Antonelli, Terry, Stout & Kraus, LLP.

(57) ABSTRACT

In the optical pickup device, while reflection light reflected from the optical multi-layer disc is divided into a plurality of regions so as to produce a plurality of divided optical beams, the divided optical beams are focused onto different positions on a photodetector, and a focus error signal is detected by employing a plurality of the divided optical beams by utilizing the knife edge method, and further, a tracking error signal is detected by employing a plurality of the divided optical beams. Furthermore, the dividing regions of the optical beam and light receiving parts are arranged in such a manner that stray light derived from other layers of the optical disc is not entered to a servo signal-purpose light receiving part of the photodetector when the divided optical beam is focused onto a target layer of the optical disc.

6 Claims, 15 Drawing Sheets

FIG.3
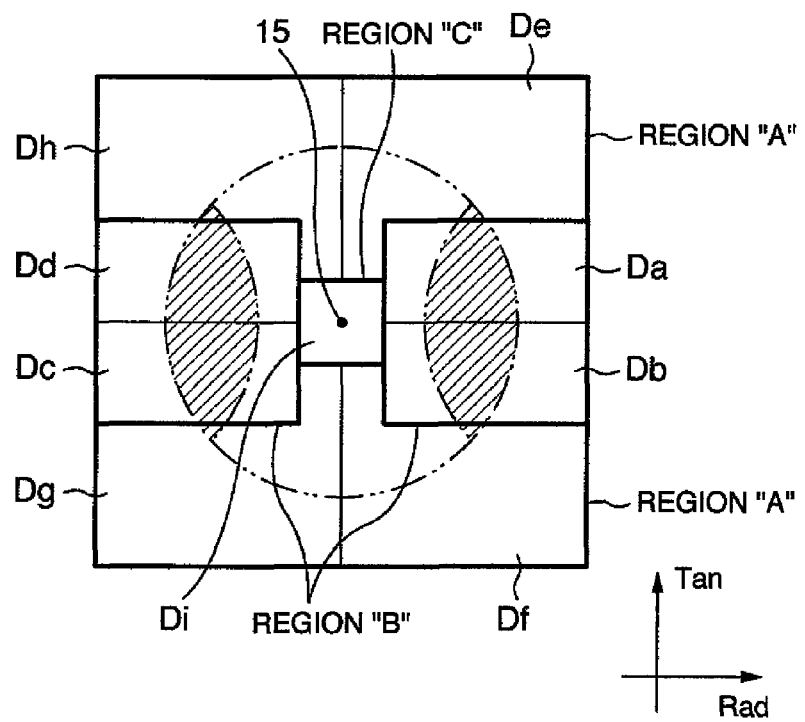
FIG.4
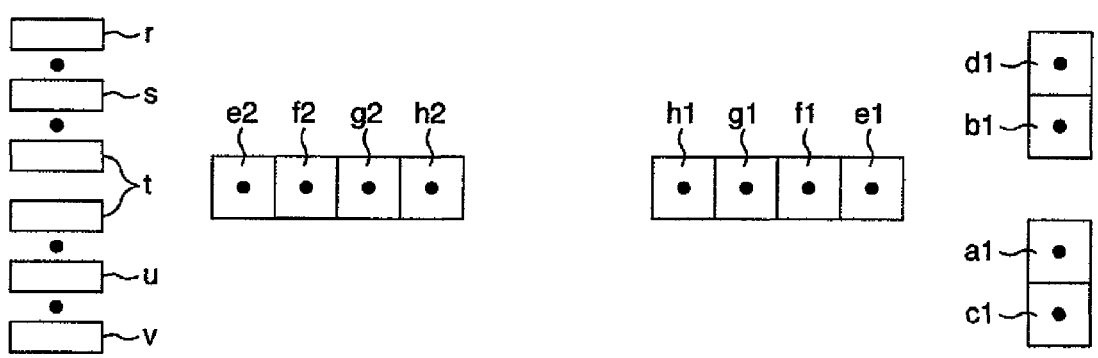

DURING L0 RECORDING / REPRODUCING OPERATION

DURING L1 RECORDING / REPRODUCING OPERATION

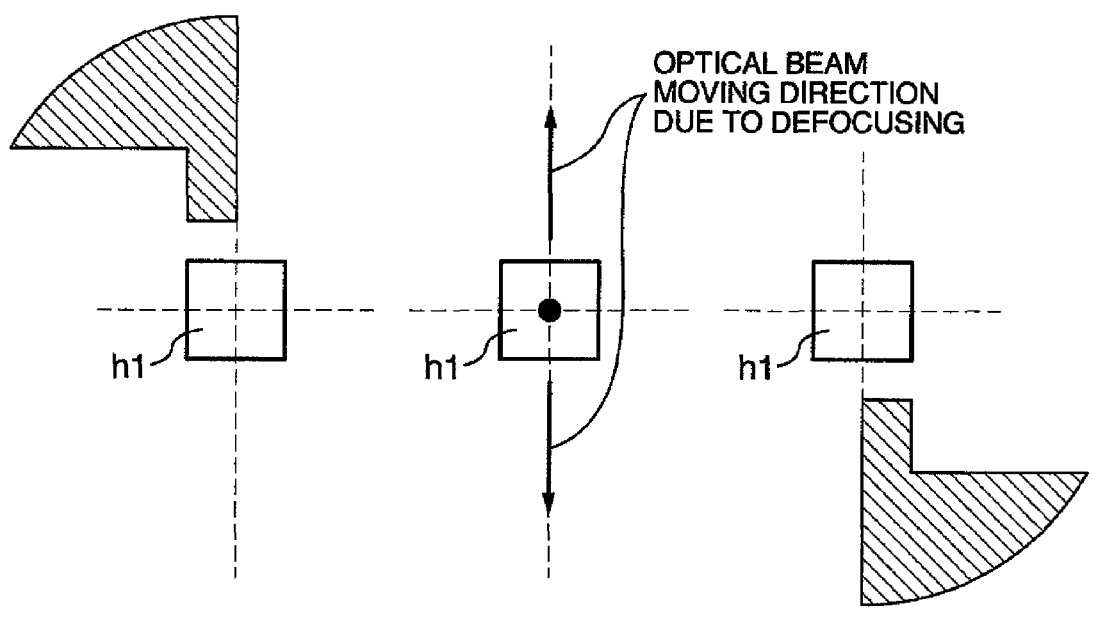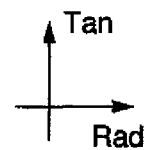

46

DURING L0 RECORDING /
REPRODUCING OPERATION

46

DURING L1 RECORDING /
REPRODUCING OPERATION

DURING L0 RECORDING /
REPRODUCING OPERATION

DURING L1 RECORDING /
REPRODUCING OPERATION

WHEN OBJECTIVE LENS DISPLACES
(OPTICAL BEAMS ON DIFFRACTION GRATING ARE TRAVELED
ALONG DIRECTIONS OF REGIONS "Da" AND "Db")

WHEN OBJECTIVE LENS DISPLACES
(OPTICAL BEAMS ON DIFFRACTION GRATING ARE TRAVELED
ALONG DIRECTIONS OF REGIONS "Dc" AND "Dd")

DURING L0 RECORDING / REPRODUCING OPERATION

DURING L1 RECORDING / REPRODUCING OPERATION

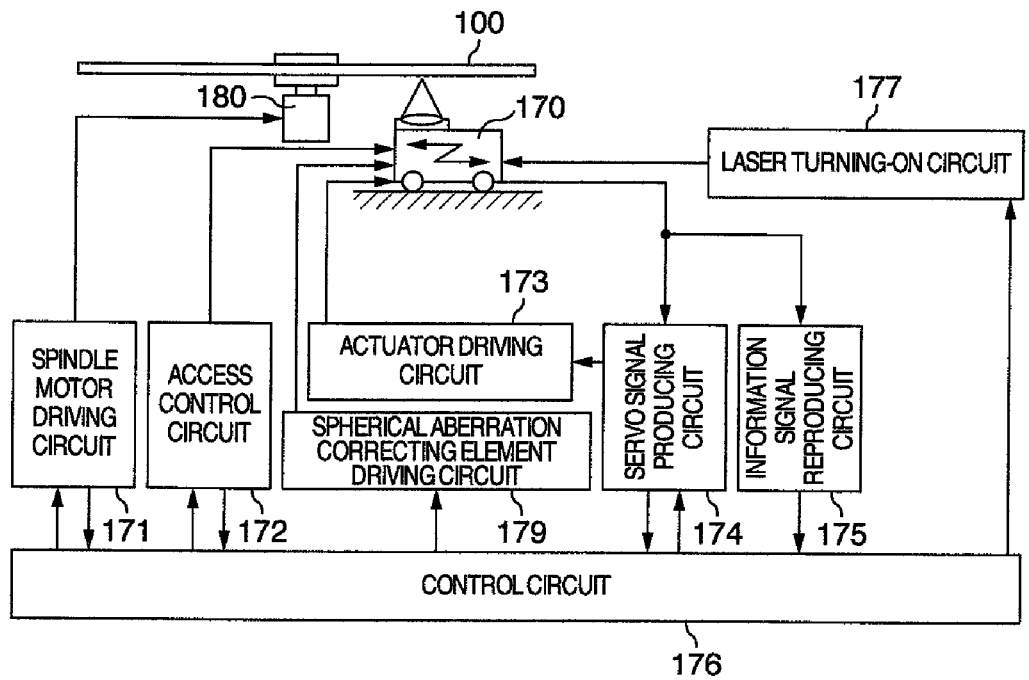
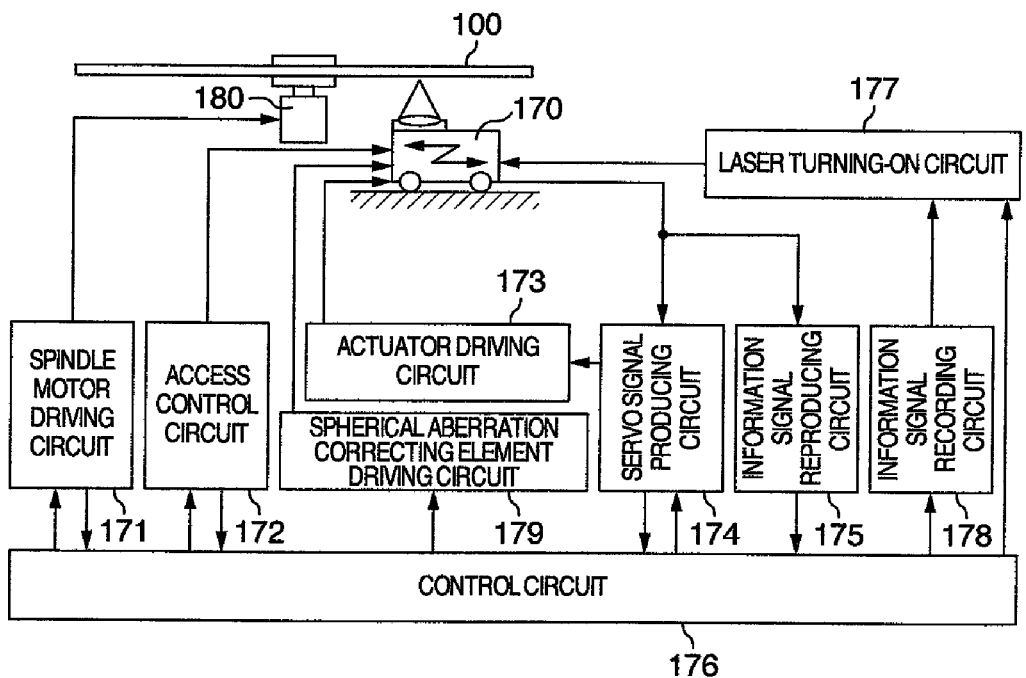

OPTICAL PICKUP DEVICE AND OPTICAL DISC APPARATUS

INCORPORATION BY REFERENCE

The present application claims priority from Japanese application JP2008-227741 filed on Sep. 5, 2008, the content of which is hereby incorporated by reference into this application.

BACKGROUND OF THE INVENTION

1. Field of the Invention

The present invention is related to an optical pickup device and an optical disc apparatus on which the optical pickup device has been mounted.

2. Description of the Related Art

Various sorts of conventional technical ideas related to optical pickup devices and optical disc apparatuses have been proposed. For instance, JP-A-2006-344344 has described such a technical idea that "the desirable signals are acquired from the optical disc having the plurality of recording layers in high precision" (refer to page 26, FIGS. 3 and 5). Also, JP-A-2006-344380 has disclosed another technical idea that "even when the optical recordable storage medium having two sets of the information recording planes is employed, the tracking error signal having the less offset amount is detected" (refer to page 14, FIG. 1). Furthermore, Japanese Publication "Shingaku Giho" CPM2005-149 issued by The Institute of Electronics, Information and Communication Engineers has described another technical idea that "the tracking-purpose photodetector is arranged in such a region where the stray light derived from other layers is not present" (2005-10, page 33, FIGS. 4 and 5). This photodetector structure has also been described in JP-A-2004-281026.

SUMMARY OF THE INVENTION

The above-described JP-A-2006-344344 has described the below-mentioned optical system: That is, the optical beam reflected on the optical disc is focused by the focusing lens; the focused optical beam passes through two sheets of the ¼ wavelength plates and the polarization optical element; the widened optical beam is focused by the focusing lens; and then, the focused optical beam is irradiated to the detector. As a result, the conventional technical idea of JP-A-2006-344344 has a problem that the structure of the optical detecting system becomes complex, and the dimension thereof becomes large. Also, the conventional technical idea of JP-A-2006-344380 has the below-mentioned problem: That is, while the 3-spot producing-purpose diffraction grating is arranged after the laser light source, one main optical spot and two optical sub-spots are irradiated onto the optical disc, so that the optical utilization efficiency of the main optical spot which is required to record information is lowered.

The above-described Japanese Publication and JP-A-2004-281026 have employed the following optical structures, namely, the tracking-purpose photodetector is arranged outside the stray light derived from other layers as to the focus-purpose optical beam produced around the focus-purpose photodetector, and furthermore, the light diffracted at the center portion of the hologram element is skipped outside the stray light derived from other layers. As a result, there is such a problem that the dimension of the photodetector becomes large.

The present invention has been object to provide an optical pickup device capable of acquiring stable servo signals in such a case that an information recording medium having a plurality of information recording layers is recorded/reproduced, and also to provide an optical disc apparatus on which the above-described optical pickup device has been mounted.

The above-described object can be achieved for example by one of the present invention.

In accordance with the present invention, both the optical pickup device and the optical disc apparatus on which the optical pickup device has been mounted can be provided by which the stable servo signals can be acquired in such a case that the information recording medium having the plurality of information recording layers is recorded/reproduced.

BRIEF DESCRIPTION OF THE DRAWINGS

FIG. 3 is an explanatory diagram for explaining a diffraction grating related to the embodiment 1 of the present invention.

FIG. 4 is an explanatory diagram for explaining a light receiving part of a photodetector related to the embodiment 1 of the present invention.

FIG. 6A to FIG. 6C are explanatory diagrams for explaining behavior of stray light traveled from other layers of the optical dual layer disc.

FIG. 16 is an explanatory diagram for explaining an arrangement of an optical reproducing apparatus according to an embodiment 4 of the present invention.

FIG. 17 is an explanatory diagram for explaining an arrangement of an optical recording/reproducing apparatus according to an embodiment 5 of the present invention.

DETAILED DESCRIPTION OF THE INVENTION

An optical pickup device and an optical disc apparatus, according to the present invention, will now be described in detail with employment of various sorts of embodiments.

Embodiment 1

Figure 1:
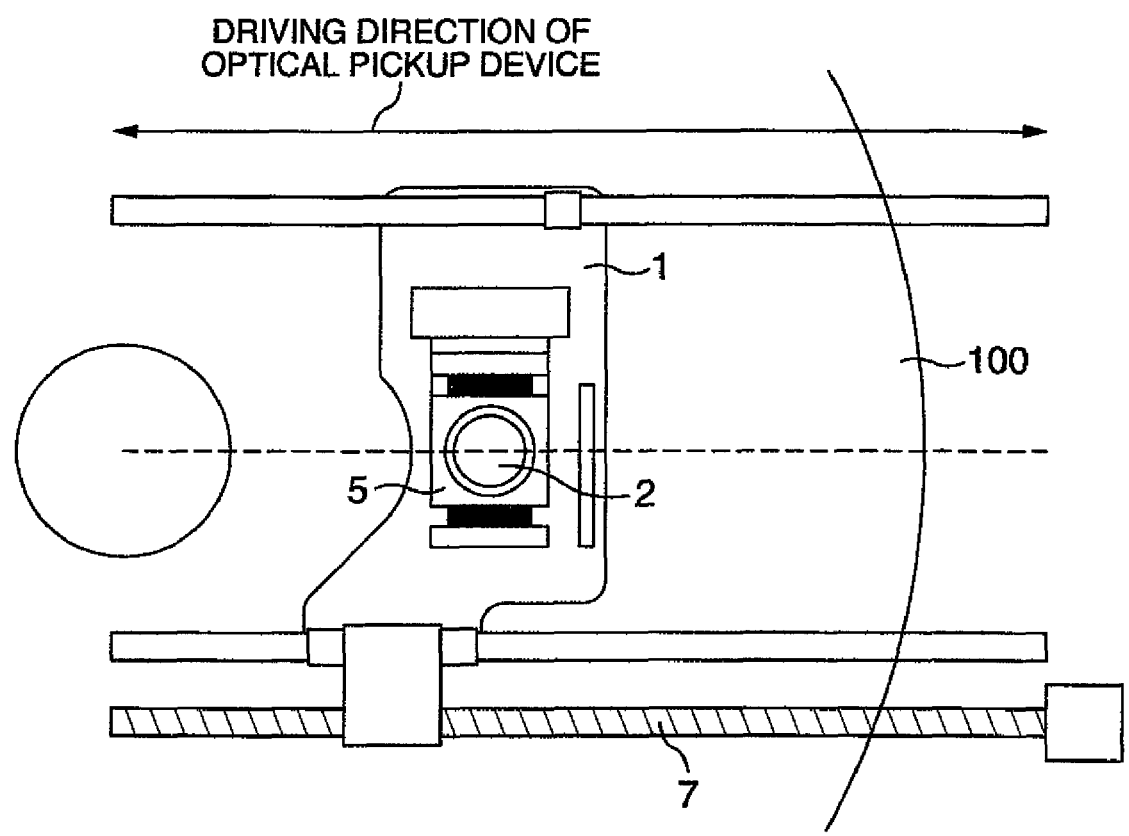
FIG. 1 is an explanatory diagram for explaining an arrangement of an optical pickup device according to an embodiment 1 of the present invention, and an optical disc.

FIG. 1 is an explanatory diagram for explaining one example as to an arrangement of an optical pickup device 1 according to a first embodiment of the present invention, and an optical disc.

The optical pickup device 1 has been arranged in such a manner that the optical pickup device 1 can be driven by a driving mechanism 7 along a radial direction (will be referred to as "Rad" direction hereinafter) as indicated in FIG. 1. Also, while an objective lens 2 is mounted on an actuator 5 on the optical pickup device 1, light is irradiated onto an optical disc 100 from the objective lens 2. The light emmited from the objective lens 2 forms a spot on the optical disc 100 and is reflected from the optical disc 100. Since the reflection light from the optical disc 100 is detected, a focus error signal and a tracking error signal are produced.

Figure 2:
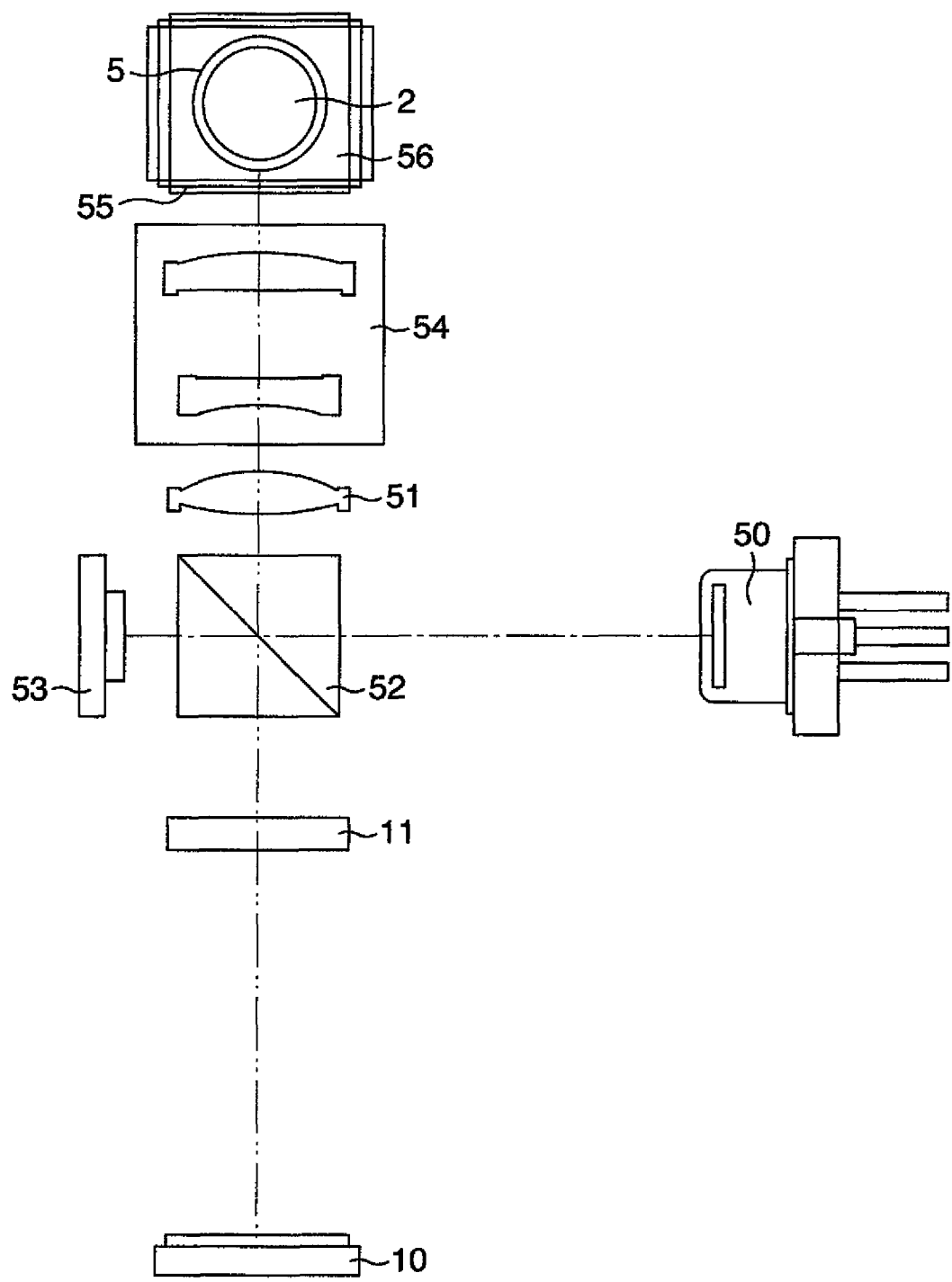
FIG. 2 is an explanatory diagram for explaining an optical system related to the embodiment 1 of the present invention.

In the above-described optical pickup device 1, an optical system thereof is represented in FIG. 2. It should be understood that although a description will be made of a BD (Blu-ray Disc), DVD and other recording type of discs may be freely employed.

In the optical system of FIG. 2, an optical beam having a wavelength of approximately 405 nm is emitted from a semi-conductor laser 50 as divergent light. The optical beam emitted from the semiconductor laser 50 is reflected on a beam splitter 52. It should also be noted that a portion of the optical beam passes through the beam splitter 52 and then is entered to a front monitor 53. Generally speaking, in such a case that information is recorded on a recording type optical disc such as a BD-RE and a BD-R, a light amount of a semiconductor laser is required to be controlled in high precision in order that a predetermined light amount of the semiconductor laser is irradiated onto a recording layer of the recording type optical disc. To this end, when a signal is recorded on the recording type optical disc, the front monitor 53 detects a change in light amounts of the semiconductor laser 50 and feeds back the detected light change amount to a driving circuit (not shown) of the semiconductor laser 50. As a result, the front monitor 53 can monitor light amounts on the optical disc.

An optical beam reflected from the beam splitter 52 is converted into a substantially parallel optical beam by a collimator lens 51. An optical beam passed through the collimator lens 51 is entered to a beam expander 54. The beam expander 54 is utilized in order to compensate spherical aberration which is caused by a thickness error of a cover layer of the optical disc 100, since the beam expander 54 changes divergent/convergent situations of an optical beam. An optical beam emitted from the beam expander 54 is reflected on a raising mirror 55, the reflected optical beam passes through a ¼ wavelength plate 56, and thereafter, the passed optical beam is focused onto the optical disc 100 by the objective lens 2 mounted on the actuator 5.

An optical beam reflected on the optical disc 100 passes through the objective lens 2, the ¼ wavelength plate 56, the raising mirror 55, the beam expander 54, the collimator 51, and the beam splitter 52, and then, is entered to a diffraction grating 11. The optical beam is divided into a plurality of regions by the diffraction grating 11, the divided optical beams are giffracted along directions which are different from each other with respect to these plural regions, and then, are focused on a photodetector 10. While a plurality of light receiving parts have been formed on the photodetector 10, the plurality of divided optical beams divided by the diffraction grating 11 are irradiated onto the respective light receiving parts. Electric signals are outputted from the photodetector 10 in response to light amounts of optical beams irradiated on the light receiving parts, and these outputted electric signals are calculated so as to produce an RF signal, a focus error signal, and a tracking error signal as reproduction signals.

FIG. 3 illustratively shows a shape of the above-described diffraction grating 11. A solid line indicates a boundary line of regions; a two-dot and dash line represents an outer shape of an optical beam of laser light; and a hatched portion indicates an interference region (push-pull pattern) between zero-order diffraction light and ± first-order diffraction light, which have been diffracted by tracks of an optical disc. The diffraction grating 11 has been formed by regions "De", "Df", "Dg" and "Dh" (region "A") in which only the zero-order diffraction light of the diffraction light diffracted by the tracks formed on the optical disc 100; regions "Da", "Db", "Dc", and "Dd" (region "B") into which the zero-order diffraction light and the ± first-order diffraction light of the above-described diffraction light are entered; and also, a region "Di" (region "C").

It is assumed that a diffraction efficiency of the diffraction grating 11 except for the region "Di" is selected to be, for instance, zero-order light:+first-order light:−first-order light=0:7:3, and a diffraction efficiency of the region "Di" is selected to be, for example, zero-order light:+first-order light:−first-order light=0:1:0. The photodetector 10 has such a pattern of light receiving parts as represented in FIG. 4.

In this case, the +first-order diffraction light diffracted by the regions "Da", "Db" "Dc", "Dd", "De", "Df", "Dg", "Dh", and "Di" of the diffraction grating 11 is entered to light receiving parts "a1", "b1", "c1", "d1", "e1", "f1", "g1", "h1", and "i1" of the photodetector 10 as shown in FIG. 4, respectively. Also, the −first-order diffraction light diffracted by the regions "Da", "Db" "Dc", and "Dd" is entered to focus error signal detecting-purpose light receiving parts "r", "s", "t", "u", and "v", respectively, whereas the −first-order diffraction light diffracted by the regions "De", "Df", "Dg", and "Dh" is entered to light receiving parts "e2", "f2", "g2", and "h2", respectively.

Signals "A1", "B1", "C1,", "D1", "E1", "F1", "G1", "H1", "I1", "R", "S", "T", "U", "V", "E2", "H2", "F2", "G2", and "H2", which have been acquired from the light receiving parts "a1", "b1", "c1", "d1", "e1", "f1", "g1", "h1", "i1", "r", "s", "t", "u", "v", "e2", "f2", "g2", and "h2", are processed based upon the below-mentioned calculations in order to produce a focus error signal, a tracking error signal, and an RF signal.

$$FES = (R+T+V) - (S+U)$$

$$TES = \{(A1+B1+E1+F1) - (C1+D1+G1+H1)\} - kt \times \{(E2+F2) - (G2+H2)\}$$

$$RF = A1+B1+C1+D1+E1+F1+G1+H1+i1+E2+F2+G2+H2 \quad \text{[Expression 1]}$$

It should be noted in the above-described expression 1 that symbol "Kt" indicates a coefficient by which when the objective lens 2 displaces, a DC component is not generated by the tracking error signal.

In this case, since the focus error detecting method corresponds to the knife edge method which is known in this field, an explanation of this knife edge method will be omitted.

Figure 5A:
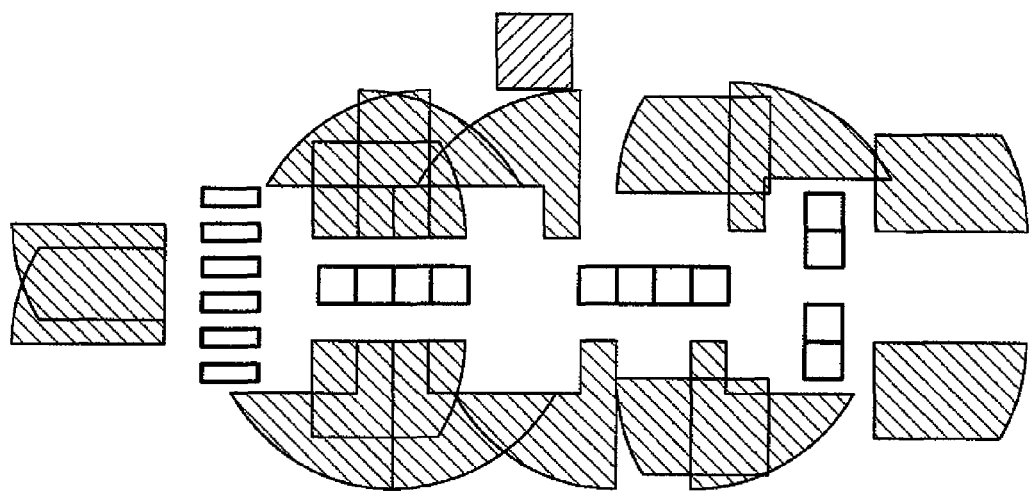
FIG. 5A and FIG. 5B are diagrams for showing shapes (viewed on detectors) of stray light when an optical dual layer disc is recorded/reproduced in the embodiment 1 of the present invention.
Figure 5B:
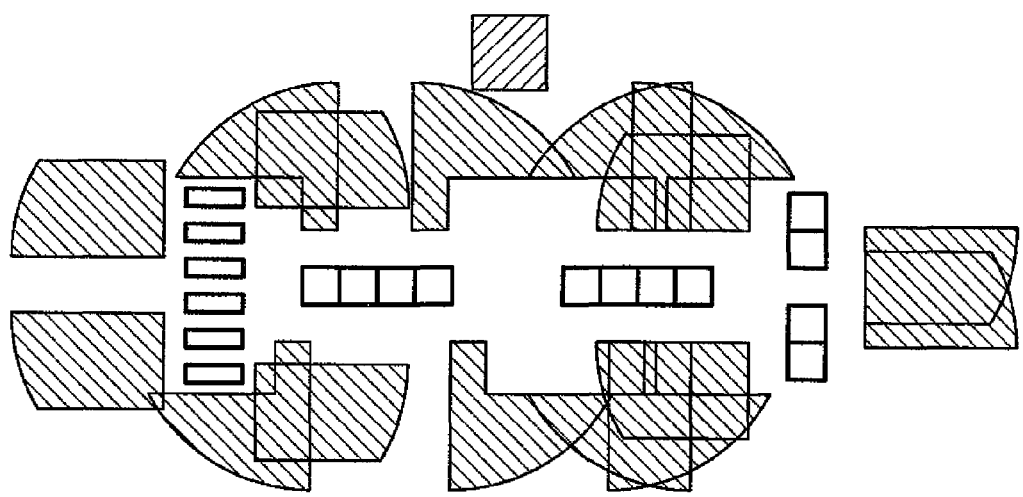

FIG. 5A and FIG. 5B indicate stray light from other layers during recording/reproducing a dual layer. FIG. 5A shows recording/reproducing of L0, and FIG. 5B shows recording/reproducing of L1. As can be understood from FIG. 5A and FIG. 5B, as to optical beams other than an optical beam diffracted by the region "Di" of the diffraction grating 11, signal light and stray light emitted from other layers are not superimposed with each other on light receiving parts. Since the signal "I1" detected from the light receiving parts "i1" is not used in order to detect a tracking error signal, but is used in order to detect a reproduction signal, even when stray light is present, there is no practical problem.

Generally speaking, when signals are actually detected, while an objective lens follows tracks formed on an optical disc, the object lens records/reproduces signals, so that the objective lens is deviated along a radial direction (will be referred to as "Rad" direction hereinafter). When the objective lens displaces, only a stray light component displaces on a photodetector. As a result, if the light receiving part pattern of the photodetector is a normal light receiving part, when the objective lens displaces, there are some possibilities that stray light emitted from other layers. In contrast to the above-explained general situation, in accordance with the present invention, the light receiving parts of the photodetector 10 are optimized with respect to the patterns of the diffraction grating 11, so that a displacement allowable amount of the objective lens 2 can be increased. In this case, as a technical idea which should be considered, how signal light should be separated from stray light with respect to displacement directions of the objective lens 2. This technical idea will be described in the following descriptions.

Figure 7A:
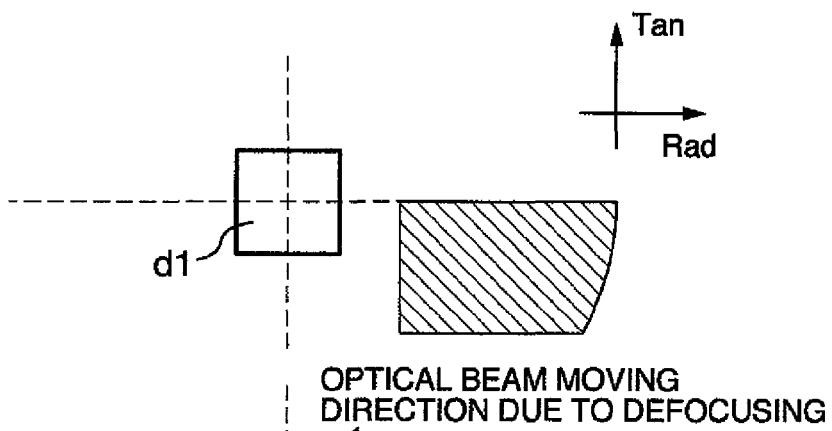
FIG. 7A to FIG. 7C are explanatory diagrams for explaining behavior of stray light traveled from other layers of the optical dual layer disc.
Figure 7B:
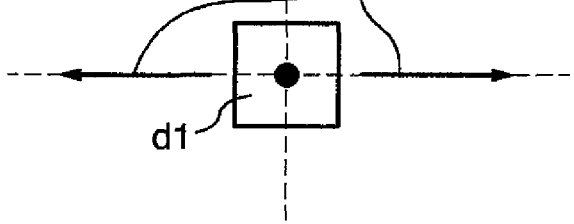
Figure 7C:
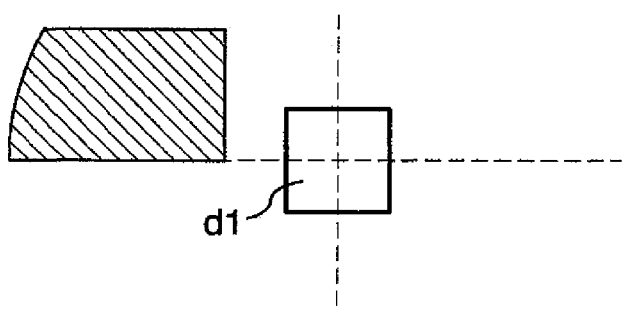

FIG. 6A to FIG. 6C represent an optical beam which has been diffracted by the region "Dh" of the diffraction grating 11 and then entered to the light receiving part "hi." Also, FIG. 7A to FIG. 7C represent an optical beam which has been diffracted by the region "Dd" of the diffraction grating 11 and then entered to the light receiving part "d1." FIG. 6A to FIG. 6C and FIG. 7A to FIG. 7C have been separated from each other, depending upon situations of optical spots on an optical disc. FIG. 6B and FIG. 7B show situations under which the optical beams have been focused on the optical discs, whereas FIG. 6A, FIG. 6C, FIG. 7A, and FIG. 7C indicate situations under which the optical beams have been defocused. It should also be noted that a relationship among FIG. 6A through FIG. 7C does not substantially depend upon positions of light receiving parts. The reason why the defocused situations are described is given as follows: That is, it can be interpreted that such a stray light emitted from a dual layer optical disc corresponds to defocused light reflected from such a position which is not a focal position.

When the optical beam situations indicated in FIG. 6A to FIG. 6C are compared with those indicated in FIG. 7A to FIG. 7C, it can be understood that optical beam moving directions are different from each other due to defocusing. The optical beam diffracted from the region "Dh" of FIG. 6A to FIG. 6C is moved along a track direction (will be referred to as "Tan" direction hereinafter) of the optical disc by being defocused. In contrast thereto, the optical beam diffracted from the region "Dd" of FIG. 7A to FIG. 7C is moved along the radial direction ("Rad" direction). This different moving direction is caused by that the optical beams are blurred in a point symmetrical manner with respect to a center 15 (see FIG. 3) of the optical beams on the diffraction grating 11, the moving directions of the defocused optical beams are different from each other. As a result, the methods for escaping the stray light are classified, depending upon the regions, which constitute an important aspect. In such a case that regions of the diffraction grating 11 have been separated along the "Tan" direction with respect to the optical beam center 15 (namely, regions "Dh" "De", "Df", "Dg", (region "A"), it is desirable that the stray light is escaped along the "Tan" direction. Since the stray light is escaped in the above-described manner, even when the objective lens 2 displaces along the "Rad" direction, this stray light is not entered to the photodetector 10. As a consequence, the light receiving parts for detecting the optical beams diffracted from the regions "Dh", "De", "Df", "Dg" of the diffraction grating 11 are arranged along the "Rad" direction, so that adverse influences caused by the stray light diffracted from other regions can be suppressed to the minimum effect.

Also, in such a case that regions of the diffraction grating 11 have been separated along the "Ran" direction with respect to the optical beam center 15 (namely, regions "Da", "Db", "Dc", "Dd" (region "B"), it is desirable that the stray light is escaped along the "Rad" direction. As a consequence, the light receiving parts for detecting the optical beams diffracted from the regions "Da", "Db", "Dc", "Dd" of the diffraction grating 11 are arrayed along the "Tan" direction, so that adverse influences caused by the stray light diffracted from other regions can be suppressed to the minimum effect, and also, the photodetector 11 can be made compact. If the optical beams diffracted from the regions "Da", "Db", "Dc", "Dd" are arrayed along the "Rad" direction, when the objective lens 2 displace along the "Rad" direction, then there is such a problem that the stray light is entered to the light receiving parts.

Figure 8A:
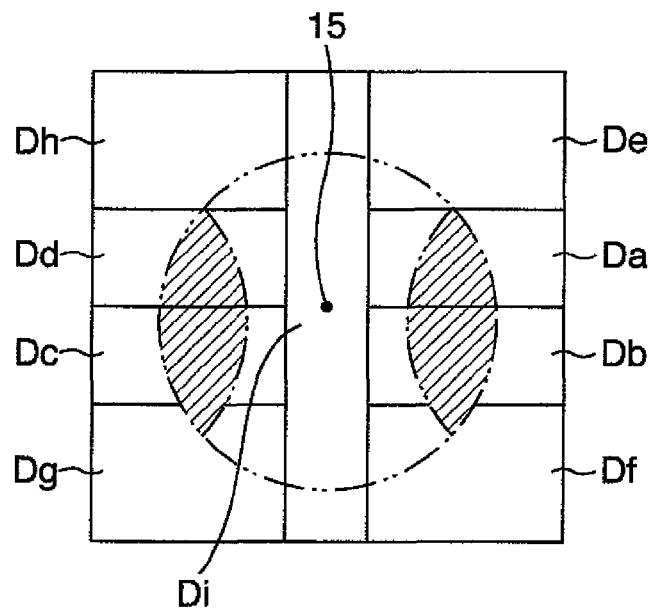
FIG. 8A and FIG. 8B are explanatory diagrams for explaining other diffraction gratings related to the embodiment 1 of the present invention.
Figure 8B:
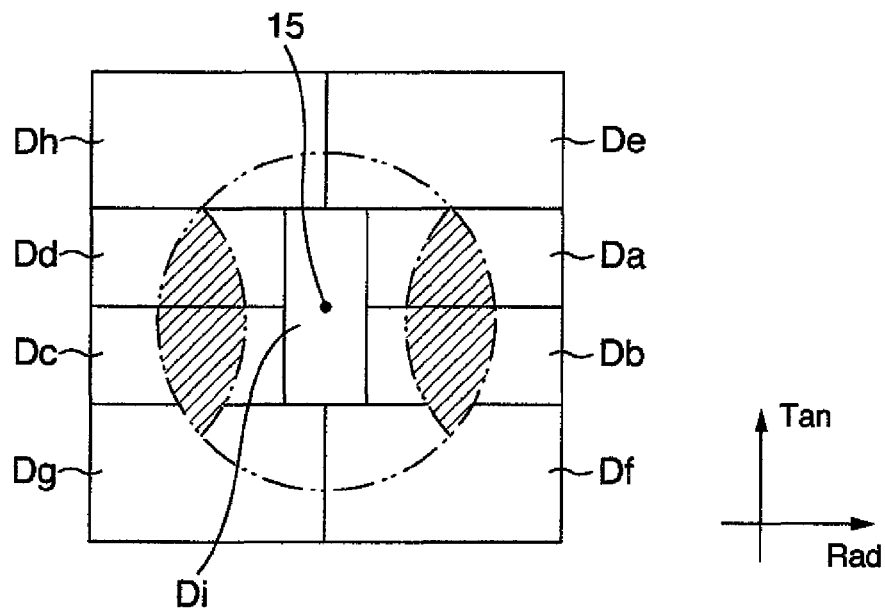

As previously described, since the right receiving parts of the photodetector 10 are made of such patterns shown in FIG. 4, the signal light can be effectively separated from the stray light, and furthermore, the photodetector 10 can be made compact. As apparent from the foregoing description, even when the diffraction grating 11 is made by having patterns as indicated in FIG. 8A and FIG. 8B, a similar effect may be achieved. Moreover, in the first embodiment, the diffraction grating 11 has been arranged at the position after the optical beam has passed through the beam splitter 52. Alternatively, while the diffraction grating 11 may be replaced by a polarizing diffraction grating, even when the polarizing diffraction grating may be arrayed at a position before the optical beam passes through the beam splitter 52, a similar effect may be achieved. Also, although the optical disc 100 having the two layers has been explained in the first embodiment, even when such optical discs having 2, or more layers may be employed, similar effects may be obtained. In addition, as apparent from the foregoing description, there is no limitation as to spherical aberration corrections.

Embodiment 2

Figure 9:
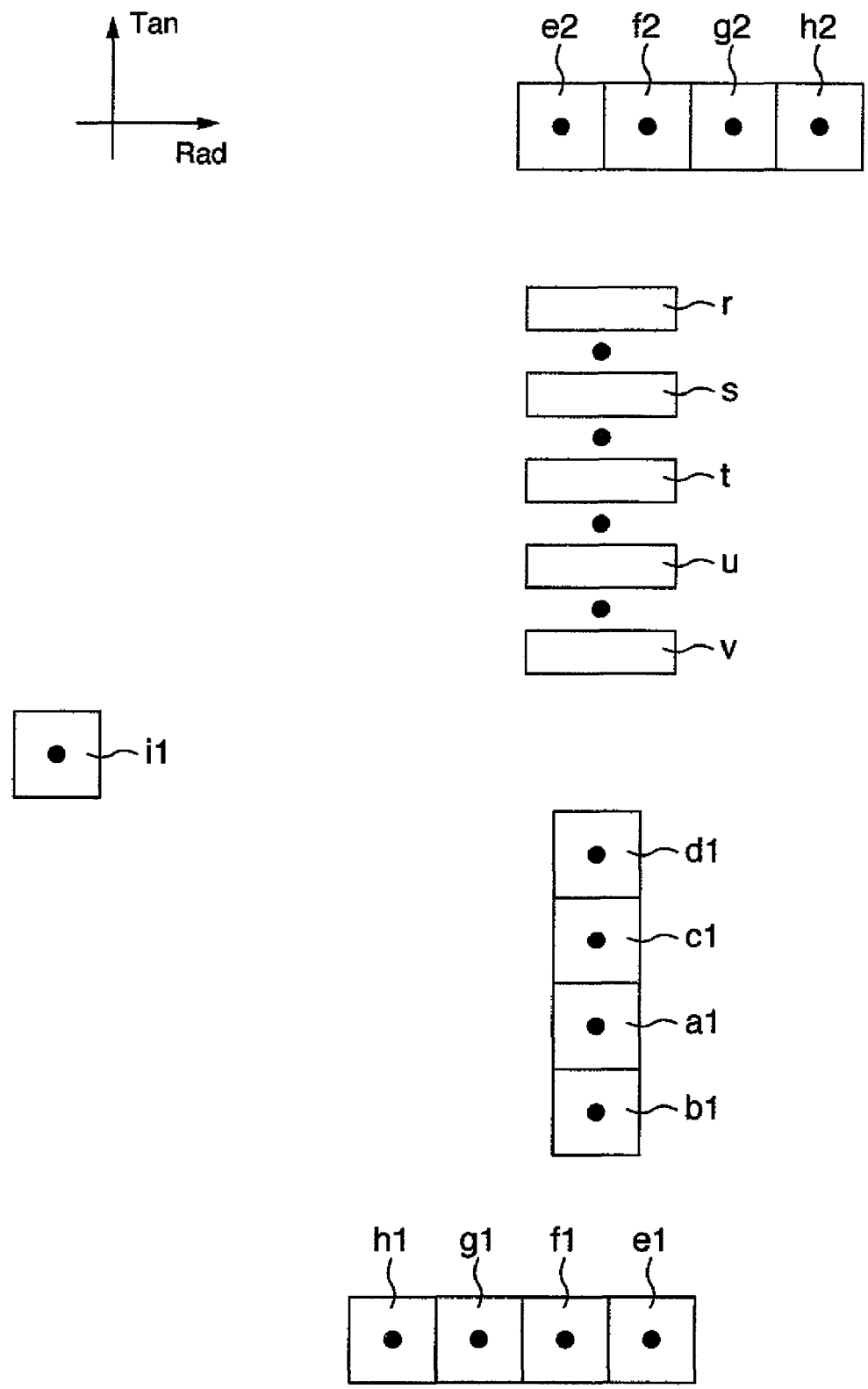
FIG. 9 is an explanatory diagram for explaining a light receiving part related to the embodiment 2 of the present invention.

FIG. 9 shows a photodetector of an optical system of an optical pickup device according to a second embodiment of the present invention. A structural difference of the optical pickup device according to the second embodiment from that of the first embodiment is given as follows: That is, a distance between the objective lens 2 and the diffraction grating 11 shown in FIG. 2 is made longer than that of the first embodiment, and other structural elements of the second embodiment are similar to those of the first embodiment.

When the distance between the objective lens 2 and the diffraction grating 11 becomes long, adverse influences caused by stray light are different from each other, depending upon recording/reproducing layers. This reason is given as follows: since the stray light constitutes convergent light during L0 recording/reproducing operation, and the stray light constitutes divergent light during L1 recording/reproducing operation, such a condition that a beam diameter of the stray light on the diffraction grating 11 is largely changed may give the adverse influence.

Figure 10A:
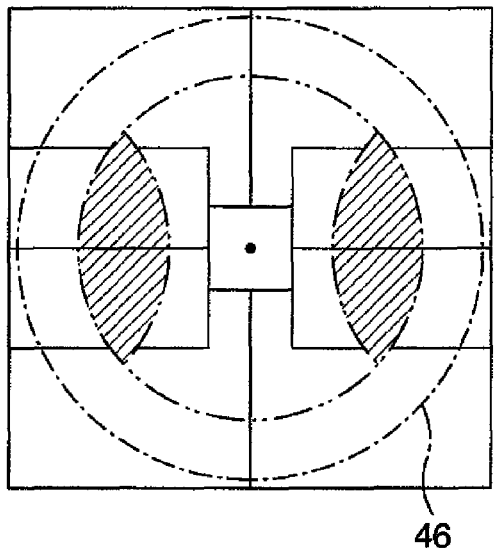
FIG. 10A and FIG. 10B are diagrams for showing shapes (viewed on diffraction gratings) of stray light when an optical dual layer disc is recorded/reproduced in an embodiment 2 of the present invention.
Figure 10B:
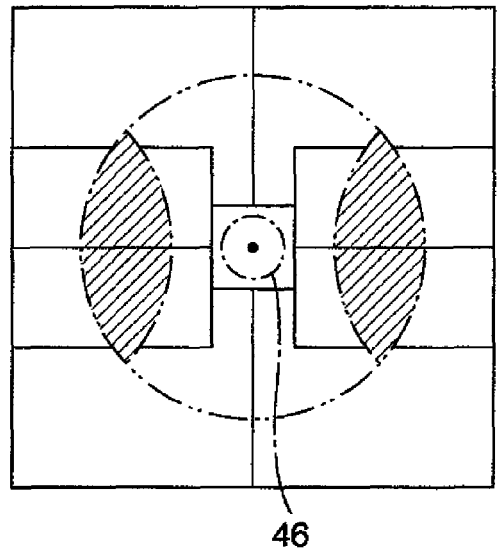
Figure 11A:
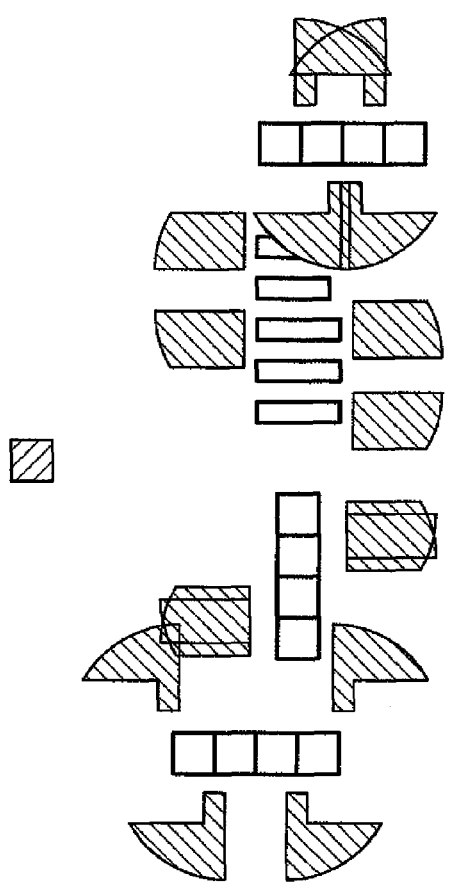
FIG. 11A and FIG. 11B are diagrams for showing shapes (viewed on detectors) of stray light when the optical dual layer disc is recorded/reproduced in the embodiment 2 of the present invention.
Figure 11B:
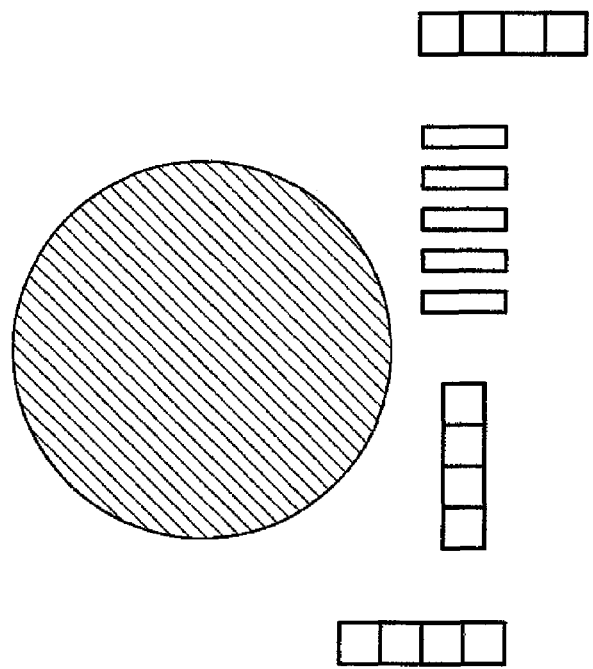

For example, it is so assumed that beam diameters of both signal light and stray light on the diffraction grating 11 are illustrated as those in FIG. 10A and FIG. 10B. FIG. 10A shows the beam diameters of the signal light and the stray light during L0 recording/reproducing operation. FIG. 10B indicates the beam diameters of the signal light and the stray light during L1 recording/reproducing operation. In these drawings, the signal light is indicated by employing a two-dot and dash line, and the stray light is indicated by employing a dot and dash line 46. The stray light in such a case is represented in FIG. 11A and FIG. 11B. FIG. 11A indicates a shape of the stray light during L0 recording/reproducing operation, and FIG. 11B shows a shape of the stray light during L1 recording/reproducing operation. As can be understood from the drawings, as to optical beams other than the optical beam diffracted from the region "Di" of the diffraction grating 11, the signal light is not superimposed with the stray light emitted from other layers on the light receiving parts. It should be understood that since the signal "I1" detected from the light receiving part "i1" is not used in order to detect a tracking error signal, but is used in order to detect a reproduction signal, even when stray light is present, there is no practical problem. Also, although the stray light has been entered to the light receiving parts "r" and "s" which detect the focus error signal, there is no problem in order to detect the servo signal.

Even in the above-described structure of the photodetector 10, as indicated in FIG. 9, the light receiving parts "a1", "b1", "c1", and "d1" of the photodetector 10 are arranged in a straight line along the "Tan" direction, and also, the light receiving parts "e1", "f1", "g1", "h1", as well as "e2", "f2", "g2", "h2" thereof are arranged in a straight line along the "Rad" direction. As a result, the stray light can be separated from the signal light, and also, the photodetector 10 can be made compact.

Figure 12A:
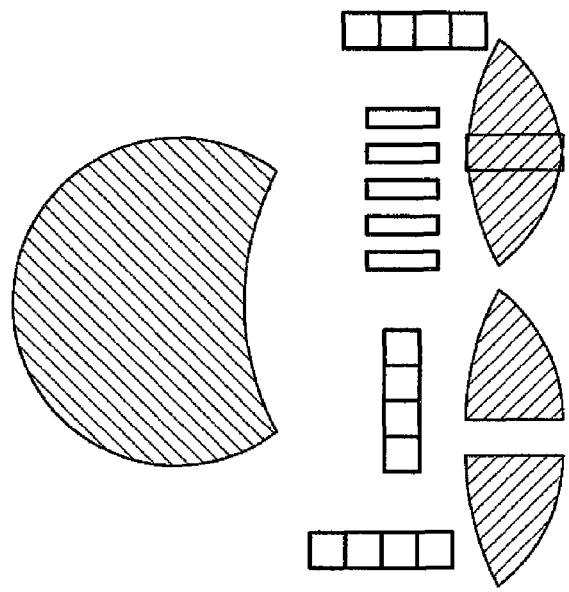
FIG. 12A and FIG. 12B are diagrams for representing such conditions that an objective lens is deviated when the optical dual layer disc is recorded/reproduced in the embodiment 2 of the present invention.
Figure 12B:
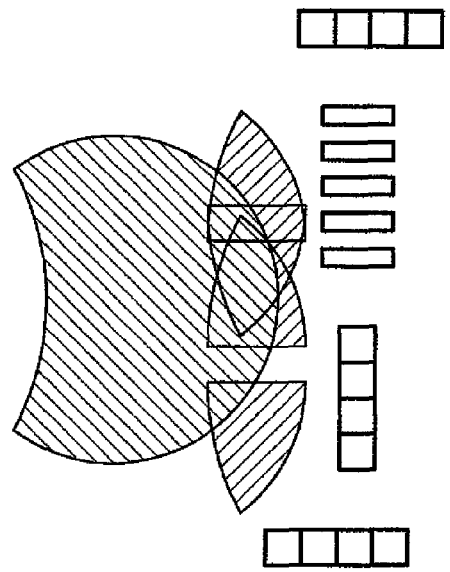

Now, a description is made why the light receiving parts of the photodetector 10 arranged along the Rad direction are not located in a line symmetrical relationship with respect to the light receiving parts thereof arranged along the "Tan" direction. That is, in such a case that the optical beams are entered as represented in FIG. 10B, the optical beams are entered to other regions (Da, Db, Dc, Dd) of the diffraction grating 11 due to displacement of the objective lens 2. In an actual case, even under such a condition that the objective lens 2 has displaced, the stray light from other layers should be escaped. FIG. 12A and FIG. 12B indicate stray light from L0 when the objective lens 2 displaces. In this case, if the objective lens 2 displaces, then the stray light for other layers, which has been diffracted by the region "Db" of the diffraction grating 11, is not entered to the light receiving part "e1." Although this problem may be solved by simply arranging the positions of the light receiving parts already arranged along the "Rad" direction and further arranging along the "Tan" direction, it is desirable that these positions of the light receiving parts already arranged along the "Rad" direction are shifted along the "Rad" direction. Since the above-described positional shifts of the light receiving parts are made, even when the objective lens 2 is deviated, the stable servo signals can be detected, and a compact photodetector may be realized.

Because of the above-described reason, the light receiving parts of the photodetector 10 arranged along the Rad direction have not been located in a line symmetrical relationship with respect to the light receiving parts thereof arranged along the "Tan" direction.

As previously explained, even if the distance between the objective lens 2 and the diffraction grating 11 is made long, the light receiving parts of the photodetector 10 are arranged as indicated in FIG. 9, so that the signal light can be electively separated from the stray light. In this example, as to signal detecting operations, the signals can be obtained by executing a similar calculation to that of the first embodiment. As apparent from the foregoing description, even when the diffraction grating 11 is made by having patterns as indicated in FIG. 8A and FIG. 8B, a similar effect may be achieved. Moreover, in the second embodiment, the diffraction grating 11 has been arranged at the position after the optical beam has passed through the beam splitter 52. Alternatively, while the diffraction grating 11 may be replaced by a polarizing diffraction grating, even when the polarizing diffraction grating may be arrayed at a position before the optical beam passes through the beam splitter 52, a similar effect may be achieved. Also, although the optical disc 100 having the two layers has been explained in the second embodiment, even when such optical discs having 2, or more layers may be employed, similar effects may be obtained. In addition, as apparent from the foregoing description, there is no limitation as to spherical aberration corrections.

Embodiment 3

Figure 13:
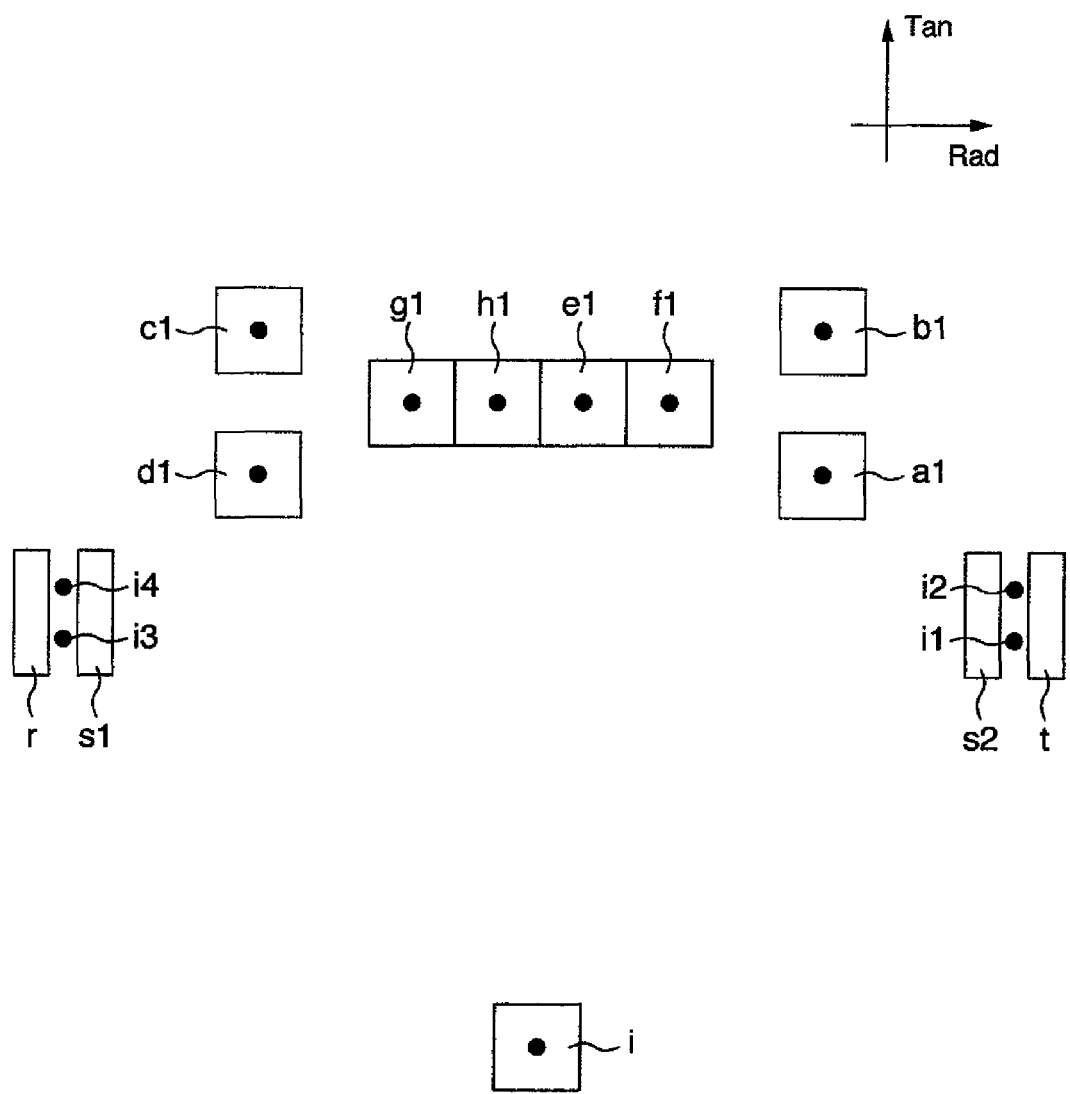
FIG. 13 is an explanatory diagram for explaining a light receiving part of a photodetector related to an embodiment 3 of the present invention.

FIG. 13 shows a photodetector of an optical system of an optical pickup device according to a third embodiment of the present invention. A structural difference of the optical pickup device according to the third embodiment from that of the first embodiment is given as follows: That is, a characteristic of a diffraction grating 11 and a detector 10 employed in the third embodiment are different from those of the above-described first embodiment, and other structural elements of the third embodiment are similar to those of the first embodiment.

Figure 14:
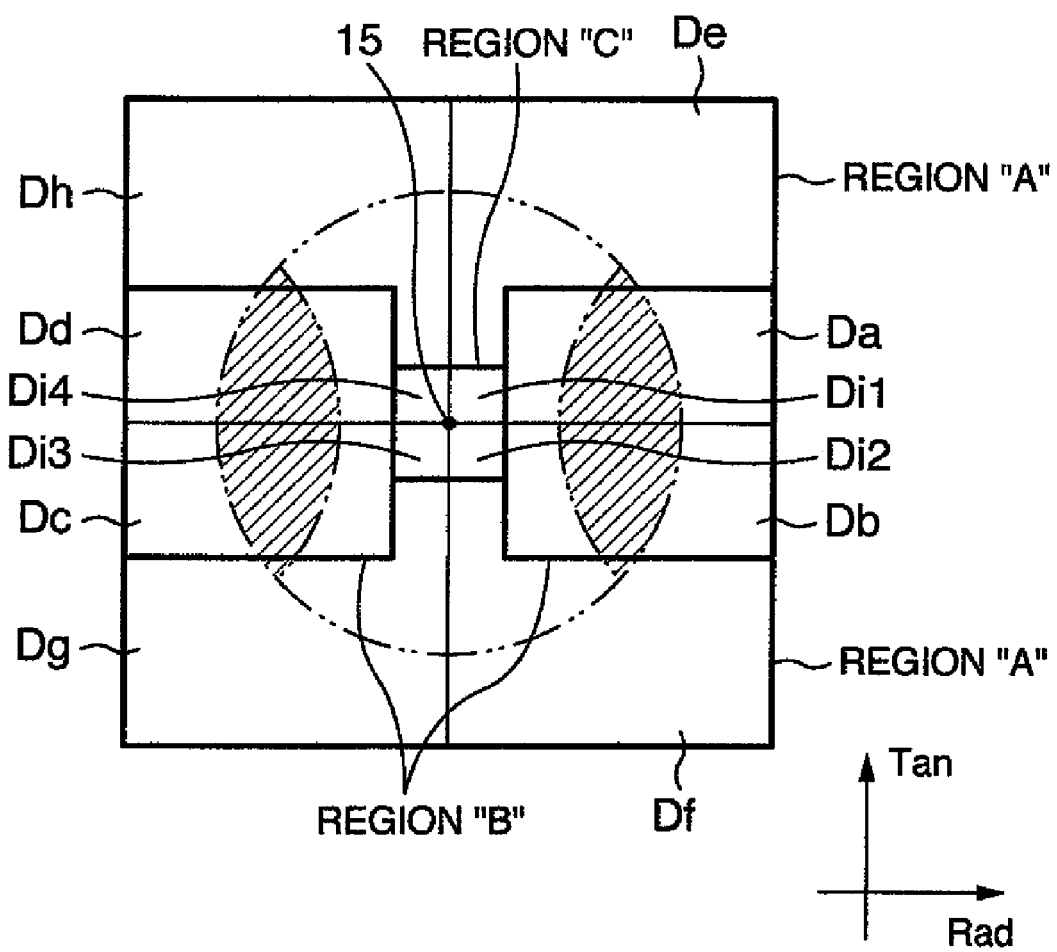
FIG. 14 is an explanatory diagram for explaining a diffraction grating related to the embodiment 3 of the present invention.

The diffraction grating 11 has been made of such a pattern as indicated in FIG. 14. A solid line indicates a boundary line of regions; a two-dot and dash line represents an outer shape of an optical beam of laser light; and a hatched portion indicates an interference region (push-pull pattern) between a zero-order diffraction light and ± first-order diffraction light, which have been diffracted by tracks of an optical disc. The diffraction grating 11 has been formed by regions "De", "Df", "Dg" and "Dh" (region "A") in which only the zero-order diffraction light of the diffraction light diffracted on the tracks of the optical disc; regions "Da", "Db", "Dc", and "Dd" (region "B") into which the zero-order diffraction light and ± first-order "diffraction light of the above-described diffraction light are entered; and also, a region "Di" (region "C"). In this example, it is assumed that a diffraction efficiency of the diffraction grating 11 is selected to be, for instance, zero-order light:+first-order light:−first-order light=7:3:0.

In this case, the +first-order diffraction light (otherwise, −first-order diffraction light) diffracted by the regions "Da", "Db" "Dc", "Dd", "De", "Df", "Dg", and "Dh" of the diffraction grating 11 is entered to light receiving parts "a1", "b1", "c1", "d1", "e1", "f1", "g1", "h1", and "i1" of the photodetector 10 as shown in FIG. 14, respectively. Also, the +first-order diffraction light (otherwise, −first-order diffraction light) diffracted by the regions "Di1", "Di2" "Di3", and "Di4" is entered to focus error signal detecting-purpose light receiving parts "r", "s1", "s2" and "t", respectively. Also, spots "i1", "i2", "i3", and "i4" on the focus error signal detecting-purpose light receiving parts correspond to optical spots diffracted by the regions "Di1", "Di2", "Di3", and "Di4" of the diffraction grating 11, respectively. In addition, zero-order diffraction light from all regions of the diffraction grating 11 is entered to the light receiving part "i."

Signals "A1", "B1", "C1", "D1", "E1", "F1", "G1", "H1", "R", "S1", "S2", "T", and "I", which have been acquired from the light receiving parts "a1", "b1", "c1", "d1", "e1", "f1", "g1", "h1", "r", "s1", "s2", "t", and "i", are processed based upon the below-mentioned calculations in order to produce a focus error signal, a tracking error signal, and an RF signal.

$$FES=(R+T)-(S1+S2)$$

$$TES=\{(A1+B1+E1+F1)-(C1+D1+G1+H1)\}-Kt\times\{(E2+F2)-(G2+H2)\}$$

$$RF=I \qquad \text{[Expression 2]}$$

It should be noted in the above-described expression 2 that symbol "Kt" indicates a coefficient by which when the objective lens 2 displaces, a DC component is not generated by the tracking error signal.

In this case, since the focus error detecting method corresponds to the knife edge method which is known in this field, an explanation of this knife edge method will be omitted.

Figure 15A:
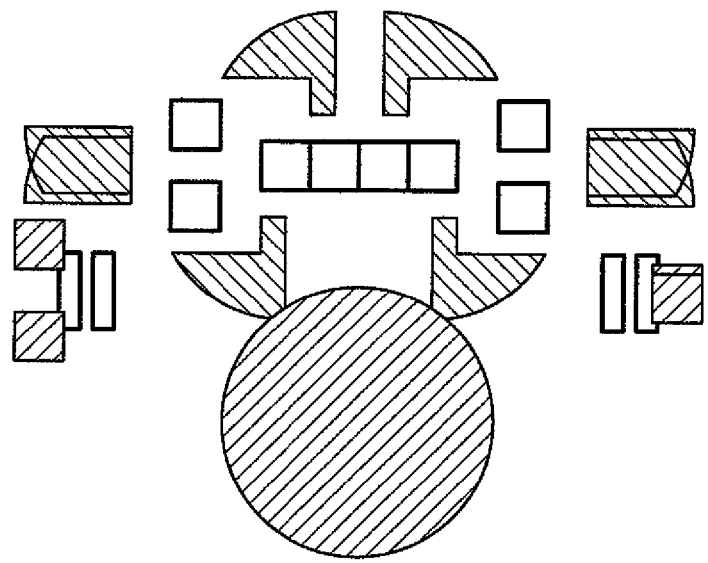
FIG. 15A and FIG. 15B are diagrams for showing shapes (viewed on detectors) of stray light when an optical dual layer disc is recorded/reproduced in the embodiment 3 of the present invention.
Figure 15B:
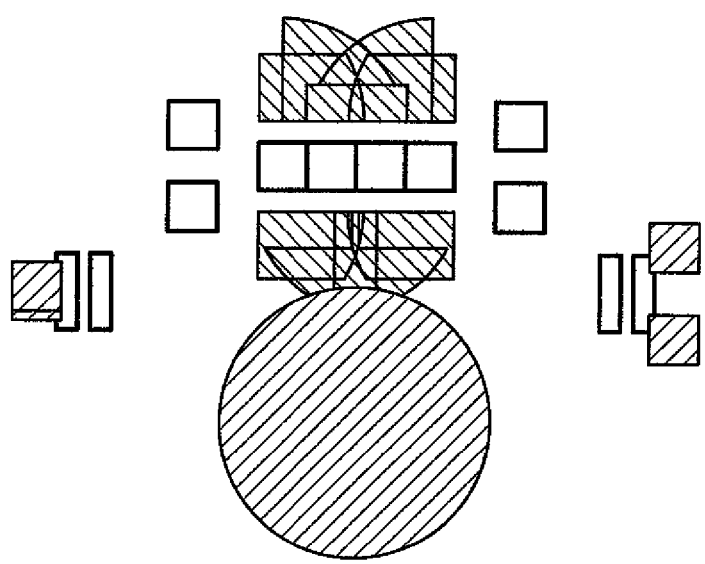

FIG. 15A and FIG. 15B indicate stray light from other layers during recording/reproducing a dual layer. FIG. 5A shows recording/reproducing of L0, and FIG. 5B shows recording/reproducing of L1. As can be understood from FIG. 15A and FIG. 15B, as to optical beams other than an optical beam diffracted by the region "Di" of the diffraction grating 11, signal light and stray light emitted from other layers of the optical disc are not superimposed with each other on light receiving parts. Since the signal "I" detected from the light receiving part "i" is not used in order to detect a tracking error signal, but is used in order to detect a reproduction signal, even when stray light is present, there is no practical problem.

In this example, light receiving parts of the photodetector 10 are arranged along the "Rad" direction, which detect optical beams diffracted by the regions "Dh", "De", "Df", "Dg" of the diffraction grating 11, and also, light receiving parts thereof are arranged along the "Tan" direction, which detect optical beams diffracted by the regions "Da", "Db", "Dc", "Dd" thereof. As a result, an adverse influence caused by the stray light can be suppressed to a minimum influence. Although the light receiving parts "a1" and "b1" have been separated from the light receiving parts "c1" and "d1" in the third embodiment, even when these light receiving parts "a1", "b1", "c1", and "d1" are arrayed in one column along the "Tan" direction, a similar effect may be apparently achieved.

Since such a method for arranging these light receiving parts of the photodetector 10 is employed, stable servo signals can be detected with respect to optical multi-layer discs. Also, with respect to the conventional technique for detecting the same one optical beam (described in JP-A-2004-281026), since the light is focused on the photodetector, the intervals among the light receiving parts can be shortened in this third embodiment. As a result, the photodetector can be made compact.

In this case, the positions of the light receiving parts of the knife edge are not limited only to the positions of FIG. 13, but even if the light receiving parts are arranged at any positions, similar effects may be apparently achieved.

As apparent from the foregoing descriptions, as to detections of the focus error signals, similar effects may be achieved even when any regions formed on the diffraction grating 11 are utilized. For instance, even when a focus error signal is detected by employing the −first-order diffraction light diffracted from one of the diffraction grating regions "Da" to "Dh" and "Di1" to "Di2", or the −first-order diffraction light diffracted from a plurality of diffraction grating regions, it is obvious that similar effects may be obtained.

Also, even in such a case that the diffraction grating 11 has such patterns as indicated in FIG. 8A and FIG. 8B and the regions "Di" of the diffraction grating 11 are sub-divided, it is obvious that similar effects may be achieved. In addition, in accordance with the third embodiment, the diffraction grating 11 has been arranged at the position after the optical beam has passed through the beam splitter 52. Alternatively, while the diffraction grating 11 may be replaced by a polarizing diffraction grating, even when the polarizing diffraction grating may be arrayed at a position before the optical beam passes through the beam splitter 52, a similar effect may be achieved. Also, although the optical disc 100 having the two layers has been explained in the third embodiment, even when such optical discs having 2, or more layers may be employed, similar effects may be obtained. In addition, as apparent from the foregoing description, there is no limitation as to spherical aberration corrections.

Embodiment 4

A description is made of an optical reproducing apparatus according to a fourth embodiment of the present invention, on which the above-described optical pickup device 1 has been mounted.

FIG. 16 shows a schematic arrangement of the optical reproducing apparatus. While the optical pickup device 1 has been equipped with a mechanism capable of driving the optical pickup device 1 along the "Rad" direction of the optical disc 100, the optical pickup device 1 is positionally controlled by the above-explained mechanism in response to an access control signal supplied from an access control circuit 172.

A predetermined laser drive current is supplied from a laser turning-ON circuit 177 to a semiconductor laser provided in the optical pickup device 1, and then, laser light having a predetermined light amount is emitted from the semiconductor laser in response to a reproducing operation. It should be noted that the laser turning-ON circuit 177 may be alternatively assembled in the optical pickup device 1.

A signal outputted from the photodetector 10 mounted in the optical pickup device 1 is transferred to both a servo signal producing circuit 174 and an information signal reproducing circuit 175. In response to the signals supplied from the photodetector 10, the servo signal producing circuit 174 produces such servo signals as a focus error signal, a tracking error signal, and a tilt control signal; and in response to the servo signals, an actuator driving circuit 173 drives an actuator provided in the optical pickup device 1 so as to positionally control the objective lens 2.

In the above-described information signal reproducing circuit 175, information signals recorded on the optical disc 100 are reproduced based upon the signals detected from the photodetector 10. A portion of the signals acquired by the servo signal producing circuit 174 and the information signal reproducing circuit 175 is transferred to a control circuit 176. A spindle motor driving circuit 171, an access control circuit 172, the servo signal producing circuit 174, the laser turning-ON circuit 177, a spherical aberration correcting element driving circuit 179, and the like are connected to the control circuit 176. Thus, this control circuit 176 controls rotations of a spindle motor 180; controls an access direction and an access position; servo-controls the objective lens 2; controls a light emitting amount of the semiconductor laser employed in the optical pickup device 1; and also, corrects spherical aberration which is caused by thickness differences of disc boards.

Embodiment 5

A description is made of an optical recording/reproducing apparatus according to a fifth embodiment of the present invention, on which the above-described optical pickup device 1 has been mounted.

FIG. 17 shows a schematic arrangement of the optical recording/reproducing apparatus. The optical recording/reproducing apparatus of this fifth embodiment has the below-mentioned structural different point from that of the optical reproducing apparatus explained in FIG. 16. That is, while an information signal recording circuit 178 is provided between the control circuit 176 and the laser turning-ON circuit 177, the control circuit 176 controls turning ON of the laser turning-ON circuit 177 based upon a recording control circuit supplied from the information signal recording circuit 178 so as to write desirable information in the optical disc 100.

Although the various sorts of embodiments as to the optical pickup device and the optical disc apparatus of the present invention have been described in the above-explanations, the present invention is not limited only to these embodiments, but may be modified and substituted in various manners. That is, for instance, the structural elements exemplified in the above-described embodiments may be alternatively combined with each other within an applicable technical scope of the present invention.

The invention claimed is:

1. An optical pickup device comprising:
a semiconductor laser for emitting laser light;
an objective lens for irradiating luminous flux emitted from said semiconductor laser to an optical disc;
a diffraction grating for branching luminous flux reflected from the optical disc; and
a photodetector having a plurality of light receiving parts which receive luminous flux branched by said diffraction grating; wherein:
said diffraction grating has 3 sets of regions "A","B", and "C";
among disc diffraction light diffracted by a track formed on said optical disc,
zero-order disc diffraction light is entered to said region "A" of the diffraction grating; and
the zero-order disc diffraction light, +first-order disc diffraction light, and –first-order disc diffraction light are entered to the region "B" thereof;
said photodetector detects a reproduction signal from grating diffraction light diffracted by said regions "A", "B", and "C";
two, or more light receiving parts of said photodetector for detecting either +first-order grating diffraction light or –first-order grating diffraction light of said diffraction grating region "A" are arrayed in a substantially straight line along a direction which is made substantially coincident with a radial direction of said optical disc; and wherein:
two, or more light receiving parts of said photodetector for detecting either +first-order grating diffraction light or –first-order grating diffraction light of said diffraction grating region "B" are arrayed along a direction which is made substantially coincident with a tangential direction of said optical disc.

2. An optical pickup device as claimed in claim 1 wherein:
a focus error signal is detected based upon the –first-order grating diffraction light diffracted by the region "B" of said diffraction grating;
a tracking error signal is detected based upon the +first-order grating diffraction light diffracted by the regions "A" and "B" of said diffraction grating;
an offset correction signal for the tracking error signal is detected based upon the –first-order grating diffraction light diffracted by the region "A" of said diffraction grating; and
the reproduction signal is detected based upon a summation of the +first-order diffraction light diffracted by said regions "A", "B", and "C."

3. An optical pickup device as claimed in claim 1 wherein:
the light receiving parts of said photodetector for detecting either the +first-order grating diffraction light or the –first-order grating diffraction light of the region "A" of said diffraction grating correspond to 4, or more light receiving parts.

4. An optical pickup device as claimed in claim 1 wherein:
the light receiving parts of said photodetector for detecting either the +first-order grating diffraction light or the –first-order grating diffraction light of the region "B" of said diffraction grating correspond to 4, or more light receiving parts.

5. An optical disc apparatus comprising:
the optical pickup device recited in claim 1;
a laser turning-ON circuit for driving said semiconductor laser employed in said optical pickup device;
a servo signal producing circuit for producing the focus error signal and the tracking error signal by employing the signals detected by said photodetector employed in said optical pickup device; and
an information signal reproducing circuit for reproducing an information signal recorded on the optical disc are mounted on said optical disc apparatus.

6. An optical pickup device comprising:
a semiconductor laser for emitting laser light;
an objective lens for irradiating luminous flux emitted from said semiconductor laser to an optical disc;
a diffraction grating for branching luminous flux reflected from the optical disc; and
a photodetector having a plurality of light receiving parts which receive luminous flux branched by said diffraction grating; wherein:
said diffraction grating has 3 sets of regions "A", "B", and "C";
among disc diffraction light diffracted by a track formed on said optical disc,
zero-order disc diffraction light is entered to said region "A" of the diffraction grating; and
the zero-order disc diffraction light, +first-order disc diffraction light and –first-order disc diffraction light are entered to the region "B" thereof;
said photodetector detects a reproduction signal from luminous flux diffracted by said regions "A", "B", and "C";
two, or more light receiving parts of said photodetector for detecting either +first-order grating diffraction light or –first-order grating diffraction light of said diffraction grating region "A" are arrayed along such a direction substantially perpendicular to a direction which is made substantially coincident with a radial direction of said optical disc;
two, or more light receiving parts of said photodetector for detecting either +first-order grating diffraction light or –first-order grating diffraction light of said diffraction grating region "B" are arrayed in a substantially straight line which is made substantially coincident with a tangential direction of said optical disc;

a quadrangle connected by both ends of a line segment "A" and both ends of a line segment "B" corresponds to a parallelogram, while said line segment "A" connects the respective light receiving parts for detecting the +first-order diffraction light of said diffraction grating region "A", and said line segment "B" connects the respective light receiving parts for detecting the −first-order diffraction light of said diffraction grating region "A"; and wherein:

a line segment "C" which connects two, or more light receiving parts for detecting both the +first-order diffraction light and the −first-order diffraction light of said diffraction grating region "B" is equal to a distance between the line segment "A" and the line segment [["B."]] "B".

\* \* \* \* \*